United States Patent
Lee et al.

(10) Patent No.: US 7,295,520 B2
(45) Date of Patent: Nov. 13, 2007

(54) SYSTEM AND METHOD OF NETWORK ADAPTIVE REAL-TIME MULTIMEDIA STREAMING

(75) Inventors: Sang-jo Lee, Kyungki-do (KR); Sang-wook Kim, Seoul (KR); Doh-hyung Kim, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1201 days.

(21) Appl. No.: 10/193,111

(22) Filed: Jul. 12, 2002

(65) Prior Publication Data
US 2003/0083870 A1  May 1, 2003

(30) Foreign Application Priority Data
Oct. 31, 2001  (KR)  ............. 2001-0067626

(51) Int. Cl.
*H04J 1/16* (2006.01)
(52) U.S. Cl. ..................... 370/236
(58) Field of Classification Search ............ None
See application file for complete search history.

(56) References Cited

U.S. PATENT DOCUMENTS

| | | | |
|---|---|---|---|
| 5,768,527 A | | 6/1998 | Zhu et al. |
| 6,085,252 A | * | 7/2000 | Zhu et al. ............ 709/231 |
| 7,020,093 B2 | * | 3/2006 | Sirivara et al. ......... 370/252 |
| 7,068,619 B2 | * | 6/2006 | Balachandran et al. ..... 370/328 |

FOREIGN PATENT DOCUMENTS

JP  7-303117  11/1995

(Continued)

OTHER PUBLICATIONS

Gkamas et al, Streaming Multimedia Data With Adaptive QoS Characteristics, 5th International Conference on Protocols for Multimedia Systems-PROMS 2000, Cracow, Poland, C. Bouras, A. Gkamas, Oct. 22-25, 2000, pp. 129-139.*

(Continued)

*Primary Examiner*—Frank Duong
(74) *Attorney, Agent, or Firm*—Buchanan Ingersoll & Rooney PC

(57) ABSTRACT

A system and method of network adaptive real-time multimedia streaming, in which a receiving bit rate of a packet that is received from a client is monitored, and the monitoring result is fed back to a streaming server, and a transfer bit rate of a packet that is transmitted by the streaming server are provided. The streaming system includes a streaming path on which packetized data are streamed, a streaming server for transmitting the packetized data at a first bit rate through the streaming path in response to a control signal, and a client for receiving the packetized data at a second bit rate according to the state of the streaming path, comparing the first bit rate with the second bit rate and generating the control signal corresponding to the comparison result. The first bit rate is controlled in response to the control signal. The size of packets and an interval between the packets are controlled by the first bit rate. The state of the network is sensed, and thus the transfer bit rate can be automatically controlled according to the state of the network.

15 Claims, 2 Drawing Sheets

FOREIGN PATENT DOCUMENTS

| | | |
|---|---|---|
| JP | 2001-230809 | 8/2001 |
| WO | 95/29549 | 11/1995 |
| WO | 99/01965 | 1/1999 |

OTHER PUBLICATIONS

Inouye et al, System Support for Mobile Multimedia Applications, IEEE, pp. 1-12, 1997.*

Busse et al, Dynamic QoS Control of Multimedia Applications based on RTP, pp. 1-4, Mar. 1995.*

Zheng et al, Traffic Management of Multimedia over ATM Networks, IEEE, pp. 33-38, Jan. 1999.*

Rejaie et al, RAP: An End-to-end Rated-based Congestion Control Mechanism for Realtime Streams in the Internet, IEEE, pp. 1337-1345, 1999.*

*Japanese Patent Office Action.

Search Report issued by the European Patent Office on Nov. 5, 2004 in corresponding application 02255301.

Srinivasan Keshav, "A Control-Theoretic Approach to Flow Control," 8282 Computer Communication Review, Sep. 21, 1991; No. 4, New York, US, pp. 3-15.

* cited by examiner

SYSTEM AND METHOD OF NETWORK ADAPTIVE REAL-TIME MULTIMEDIA STREAMING

Priority is claimed to Patent Application Number 2001-67626 filed in Republic of Korea on Oct. 31, 2001, herein incorporated by reference.

BACKGROUND OF THE INVENTION

1. Field of the Invention

The present invention relates to a multimedia streaming system and method, and more particularly, to a real-time multimedia streaming system and method, in which a transfer bit rate is adaptively controlled according to the state of a network by comparing an interval between packets that are transmitted from a server to a client network with an interval between packets that are received by a server from a client network.

2. Description of the Related Art

A bit rate of data to be transmitted is referred to as a data transfer rate (or data rate). The bandwidth of a path through which data are transmitted, or a path through which data are streamed (hereinafter, referred to as a 'streaming path') is a very important factor for real-time multimedia streaming in an Internet network.

For example, in case that there is no bottleneck on the streaming path or there is no network congestion, it is preferable that a bit rate of data that are transmitted by a streaming server (hereinafter, referred to as a 'transfer bit rate'), and a bit rate of data that are received from the client (hereinafter, referred to as a 'receiving bit rate') are the same. Thus, data that are resolved into packets by the streaming server and are transmitted to the client through the streaming path may be decoded and regenerated in real-time by the client without any delay or loss. However, in case that the transfer bit rate is larger than the bandwidth of the streaming path, the data that are transmitted from the streaming server to the client may be lost in a router which causes the bottleneck.

That is, when network congestion or bottleneck on the streaming path occurs, the receiving bit rate of the client, which receives the packets that are transmitted by the streaming server, is gradually decreased, and thus, the packets cannot be received and are lost.

For example, in a streaming method and apparatus disclosed in U.S. Pat. No. 5,768,527, a bit rate is changed only on the basis of packet loss. Accordingly, it is difficult to immediately meet the variation of the state of a network, and it takes much time to normally transmit packets.

SUMMARY OF THE INVENTION

To solve the above problems, it is an object of the present invention to provide a system and method of network adaptive real-time multimedia streaming, in which a receiving bit rate of a packet that is received from a client is monitored, and the monitoring result is fed back to a streaming server, and a transfer bit rate of a packet that is changed by the streaming server.

Accordingly, to achieve the above object, according to one aspect of the present invention, there is provided a streaming system. The streaming system includes a streaming path on which packetized data are streamed, a streaming server for transmitting the packetized data at a first bit rate through the streaming path in response to a control signal, and a client for receiving the packetized data at a second bit rate according to the state of the streaming path, comparing the first bit rate with the second bit rate and generating the control signal corresponding to the comparison result. The first bit rate is controlled in response to the control signal.

The size of packetized data and an interval between the packetized data are controlled by the first bit rate. The client outputs the control signal for decreasing the first bit rate when loss occurs in the received packetized data, and the client compares the first bit rate with the second bit rate and generates the control signal corresponding to the comparison result when loss does not occur in the received packetized data.

If a first packet interval between two packetized data that are output from the streaming server is determined by the first bit rate, and a second packet interval between two packetized data that are received from the client is determined by the second bit rate, the client compares the first packet interval with the second packet interval and outputs the control signal for decreasing the first bit rate when the second packet interval is larger than the first packet interval.

If a first packet interval between two packetized data that are output from the streaming server is determined by the first bit rate, and a second packet interval between two packetized data that are received from the client is determined by the second bit rate, the client compares the first packet interval with the second packet interval, compares a measured bandwidth of the streaming path with the first bit rate when the second packet interval is not larger than the first packet interval, and outputs the control signal for increasing the first bit rate to the bandwidth to the streaming server according to the comparison result.

The first bit rate is determined by the measured bandwidth of the streaming path at a first stage where streaming begins, and the first bit rate is determined in response to the control signal at a second stage where streaming is progressing.

The streaming server includes a bandwidth-measuring unit for measuring the bandwidth of the streaming path, a controlling unit for controlling the first bit rate in response to the bandwidth that is measured by the bandwidth-measuring unit or in response to the control signal, a media-controlling unit for outputting data corresponding to the first bit rate from a scalable encoded bitstream, and a transmitting unit for receiving the data and transmitting the packetized data at the first packet interval. The first packet interval is controlled by the first bit rate or the control signal.

The client includes a receiving unit for receiving and recombining the packetized data at the second packet interval, and a determining unit for comparing the first packet interval with the second packet interval, generating the control signal corresponding to the comparison result and outputting the control signal to the streaming server. A packet-pair algorithm is used so that the bandwidth-measuring unit measures the bandwidth of the streaming path.

In order to achieve the above object, according to another aspect of the present invention, there is provided a multimedia streaming system. The multimedia streaming system includes a streaming path on which packets are streamed, a streaming server for transmitting the packets having a first packet interval that is controlled in response to a control signal at a first bit rate through the streaming path, and a client for receiving the packets having a second packet interval according to the state of the streaming path at a second bit rate. The client compares the first packet interval with the second packet interval and outputs the control signal according to the comparison result.

The client outputs the control signal for controlling the first packet interval if loss occurs in the packets, and the client compares the first packet interval with the second packet interval and outputs the control signal according to the comparison result when loss does not occur in the packets.

The first packet interval is increased in response to the control signal or the first bit rate is decreased in response to the control signal when the second packet interval is larger than the first packet interval. If the first packet interval is the same as the second packet interval and the bandwidth of the streaming path that is measured before streaming is larger than the first bit rate, the first bit rate is increased in response to the control signal.

In order to achieve the above object, according to another aspect of the present invention, there is provided a method of adaptive multimedia streaming packets according to the state of a streaming path. The method includes (a) transmitting the packets having a first packet interval at a first bit rate through the streaming path, (b) receiving the packets having a second packet interval at a second bit rate according to the state of the streaming path, and (c) controlling the first bit rate or the first packet interval when it is determined whether the packets are lost on the streaming path and loss occurs in the packets, and comparing the first packet interval with the second packet interval and controlling the first bit rate or the first packet interval according to the comparison result if loss does not occur in the packets.

Step (a) further includes (a1) packetizing data of a bitstream corresponding to the first bit rate according to the bandwidth of the streaming path that is measured at a first stage when streaming begins, and transmitting the packets at the first packet interval, (a2) packetizing the data of a bitstream corresponding to the first bit rate that is controlled in response to the control signal at a second stage when streaming is progressing, and transmitting the packets at the first packet interval.

Step (a) further includes (a1) measuring the bandwidth of the streaming path, (a2) controlling the first bit rate in response to the bandwidth that is measured in step (a1) or in response to the control signal, (a3) fetching data corresponding to the first bit rate from a scalable encoded bitstream, and (a4) packetizing the data and transmitting generated packets at the first packet interval.

Step (b) includes determining the second bit rate or the second packet interval according to congestion on the streaming path, bottleneck on the streaming path or the number of users who are connected to the streaming path.

Step (c) further includes (c1) decreasing the first bit rate when the second packet interval is larger than the first packet interval, and increasing the first bit rate to the bandwidth when the second packet interval is the same as the first packet interval and the bandwidth of the streaming path that is measured before streaming is larger than the first bit rate, and (c2) performing step (a) if the second packet interval is the same as the first packet interval and the bandwidth of the streaming path is smaller than the first bit rate.

In order to achieve the above object, according to another aspect of the present invention, there is provided a method of multimedia streaming packets. The method includes (a) transmitting the packets having a first packet interval through a streaming path, (b) receiving the packets having a second packet interval through the streaming path, and (c) controlling the first packet interval when it is determined whether the packets that are received through the streaming path are lost and loss occurs in the packets, and comparing the first packet interval with the second packet interval and controlling the first packet interval according to the comparison result when loss does not occur in the packets.

Step (a) further includes (a1) measuring the bandwidth of the streaming path at a first stage when streaming begins, and transmitting the packets having the first packet interval according to the measured bandwidth, and (a2) transmitting the packets at the first packet interval that is controlled in step (c) at a second stage when streaming is progressing.

Step (a) further includes (a1) measuring the bandwidth of the streaming path, (a2) fetching data corresponding to the bandwidth that is measured in step (a1) or corresponding to the first packet interval that is controlled in step (c) from a scalable encoded bitstream, and (a3) packetizing the data and transmitting the generated packets at the first packet interval.

Step (b) includes determining the second packet interval according to congestion on the streaming path, bottleneck on the streaming path or the number of users who are connected to the streaming path.

BRIEF DESCRIPTION OF THE DRAWINGS

The above object and advantages of the present invention will become more apparent by describing in detail a preferred embodiment thereof with reference to the attached drawings in which.

Figure 1:
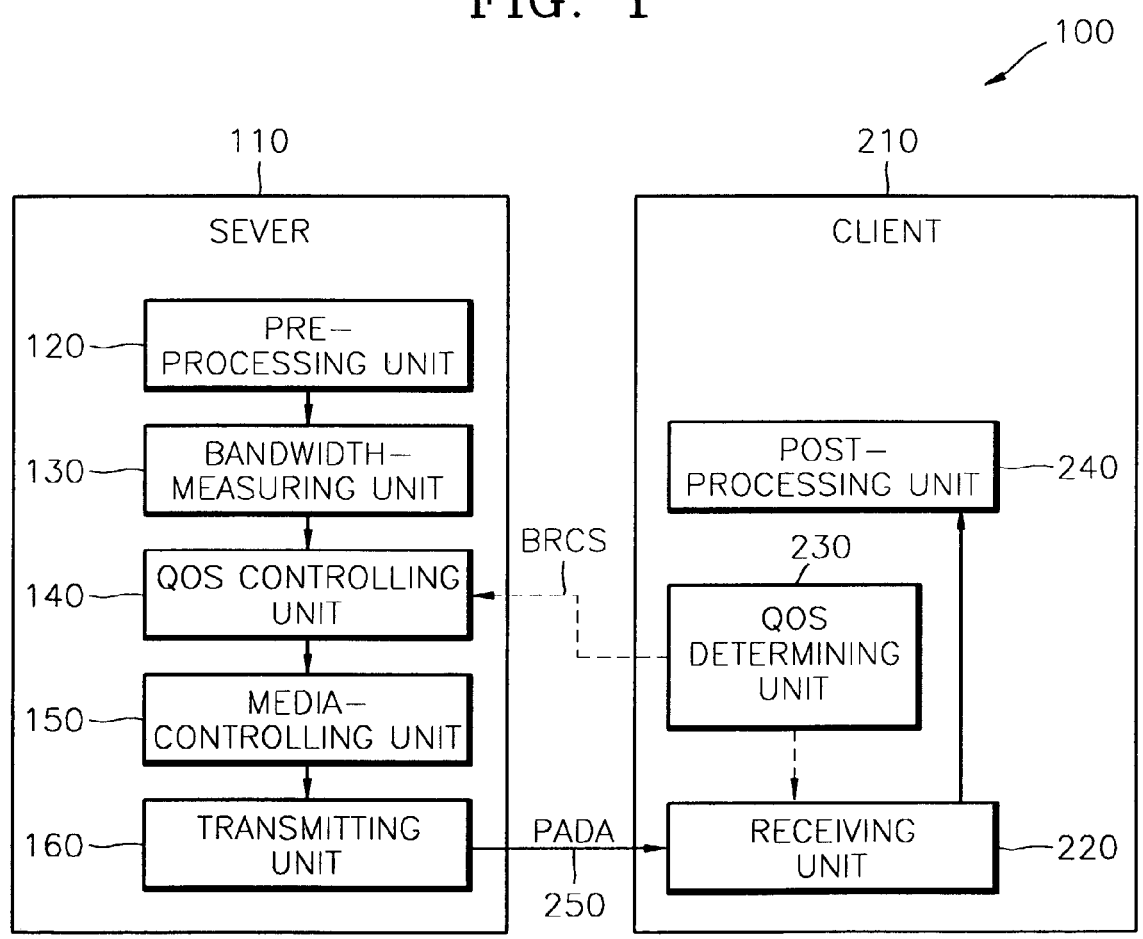
FIG. 1 is a block diagram of a real-time multimedia streaming system according to an embodiment of the present invention.

DETAILED DESCRIPTION OF THE INVENTION.

Hereinafter, the present invention will be described in detail by describing preferred embodiments of the invention with reference to the accompanying drawings. Like reference numerals refer to like elements throughout the drawings.

FIG. 1 is a block diagram of a real-time multimedia streaming system according to an embodiment of the present invention. Referring to FIG. 1, a multimedia streaming system 100 includes a server 110 for packetizing streaming data and transmitting the streaming data, a client 210 for receiving the packetized streaming data, and a streaming path 250 that is connected between the server 110 and the client 210.

The server 110 measures the bandwidth of the streaming path 250, determines a transfer bit rate, reads data from a bitstream according to the determined transfer bit rate, packetizes the read data and transmits the packetized data (hereinafter, referred to as a 'transmitted packet') to the client 210 through the streaming path 250.

Also, the server 110 resets the transfer bit rate in response to a bit rate control signal (BRCS) as an output signal of a quality of service (QoS) determining unit 230 and transmits the transmitted packet to the client 210 in response to the transfer bit rate.

The server 110 includes a pre-processing unit 120, a bandwidth measuring unit 130, a QoS controlling unit 140, a media-controlling unit 150, and a transmitting unit 160. The client 210 includes a receiving unit 220, a QoS determining unit 230, and a post-processing unit 240.

The pre-processing unit 120 processes all steps before streaming. For example, the pre-processing unit 120 selects contents for streaming or is prepared to read the selected contents or initializes the server 110 to transmit streaming.

The bandwidth-measuring unit 130 measures the bandwidth of the streaming path 250 (for example, a transmission line) before streaming begins. The bandwidth-measuring unit 130 measures the bandwidth of the streaming path 250 between the server 110 and the client 210 using a packet-pair algorithm.

In the packet-pair algorithm, two packets having a predetermined size are transmitted from the server 110 to the client 210 at a predetermined inter departure time, and then an inter arrival time between the two packets that are received from the client 210 is measured, and thus the bandwidth of a bottleneck link on the measured streaming path is measured.

Here, in order to increase a measurable bandwidth, an interval between packets that are transmitted by the server 110 must be small, and the size of the packets must be large. The bandwidth that is measured by the client 210, that is, the bandwidth of the streaming path 250 is transmitted to the server 110.

The QoS controlling unit 140 determines the transfer bit rate in response to the bandwidth that is measured by the bandwidth-measuring unit 130 and in response to the control signal BRCS that is fed back from the QoS determining unit 230 of the client 210.

That is, at an initial stage of streaming, streaming is performed through the measured bandwidth but streaming is performed by the transfer bit rate, which is set by the state of the streaming path 250, while streaming is progressing. Thus, if the transfer bit rate is determined, an interval between packets and the size of the packets are determined.

In other words, the QoS controlling unit 140 determines the transfer bit rate on the basis of the bandwidth that is measured by the bandwidth-measuring unit 130. In this case, the transfer bit rate is preferably set to be smaller than the measured bandwidth in consideration of the overhead occurring in packetization.

After the streaming has begun, the transfer bit rate is adaptively changed to be suitable for the streaming path 250 or the state of a network in response to the control signal BRCS that is feedback from the client 210. That is, the size of the packets and the interval between the packets are controlled by the transfer bit rate.

For example, in case that an inter arrival time between two packets that are received by the receiving unit 220 of the client 210 (hereinafter, referred to as a 'received packet interval') becomes larger than an inter departure time between two packets that are transmitted (hereinafter, referred to as a 'transmitted packet interval') by the transmitting unit 160 of the server 110, or loss occurs in the received packets, the QoS determining unit 230 outputs the predetermined control signal BRCS for decreasing the transfer bit rate or controlling the transmitted packet interval to the QoS controlling unit 140. The QoS controlling unit 140 decreases the transfer bit rate or increases the transmitted packet interval in response to the control signal BRCS. Thus, the server 110 automatically controls the transfer bit rate or the transmitted packet interval according to the state of the streaming path 250.

Also, in case that the received packet interval and the transmitted packet interval are the same, or a difference between the received packet interval and the transmitted packet interval is within a predetermined permitted range, the QoS determining unit 230 outputs the predetermined control signal BRCS for increasing the transfer bit rate to the QoS controlling unit 140.

The QoS controlling unit 140 gradually increases the transfer bit rate to the bandwidth that is initially measured by the bandwidth-measuring unit 130 in response to the control signal BRCS. However, the increased transfer bit rate must be smaller than the initially measured bandwidth.

The media-controlling unit 150 reads data corresponding to the transfer bit rate from the bitstream that is scalable encoded according to the transfer bit rate determined by the QoS controlling unit 140, and transmits the data to the transmitting unit 160.

For example, in case that the transfer bit rate is large, the media-controlling unit 150 can read a large amount of data, that is, the upper hierarchy data, from the bitstream. When the transfer bit rate is small, the media-controlling unit 150 can read only the lower hierarchy data from the bitstream.

The transmitting unit 160 packetizes data output from the media-controlling unit 150 and transmits the packetized data PADA to the receiving unit 220 of the client 210 through the streaming path 250 at a predetermined interval for a predetermined amount of time.

That is, the transmitting unit 160 transmits a number N of packets to the receiving unit 220 through the streaming path 250 at a predetermined interval A/N for a predetermined amount of time A.

For example, when the transmitting unit 160 must receive 10,000 bytes of data from the media-controlling unit 150 and must transmit all of the received data for a predetermined amount of time (for example, one second), the transmitting unit 160 divides the received data into ten packets and transmits the packets, each being comprised of 1,000 bytes at every 0.1 second.

Thus, the occupation rate of the bandwidth of the streaming path 250 can be maintained. In this case, it is preferable that the received data are packetized so that the size of a packet is less than 1500 bytes in consideration of the overhead.

The client 210 receives the packetized data PADA, recombines the PADA, and demodulates the PADA to regenerate the original data. Also, the client 210 determines the current state of the network using the state (for example, inter arrival time (delay) of the received packets and loss etc.) of reception of the packets that are received by the receiving unit 220 and feeds back the control signal BRCS according to the determination result to the QoS controlling unit 140 of the server 110.

The receiving unit 220 receives the packetized data PADA, recombines the PADA and outputs the recombined data to the post-processing unit 240. The receiving unit 220 records the time when the PADA are received, and whether the packets are lost or not.

The QoS determining unit 230 determines the current streaming path 250 or the current state of the network using the inter arrival time (delay) and loss of the packets that are received by the receiving unit 220, and feeds back the control signal BRCS according to the determination result to the QoS controlling unit 140 of the server 110. The operation of the QoS determining unit 230 will be described in detail with reference to FIG. 2. The post-processing unit 240 receives the recombined data and demodulates the data to regenerate the original data.

Figure 2:
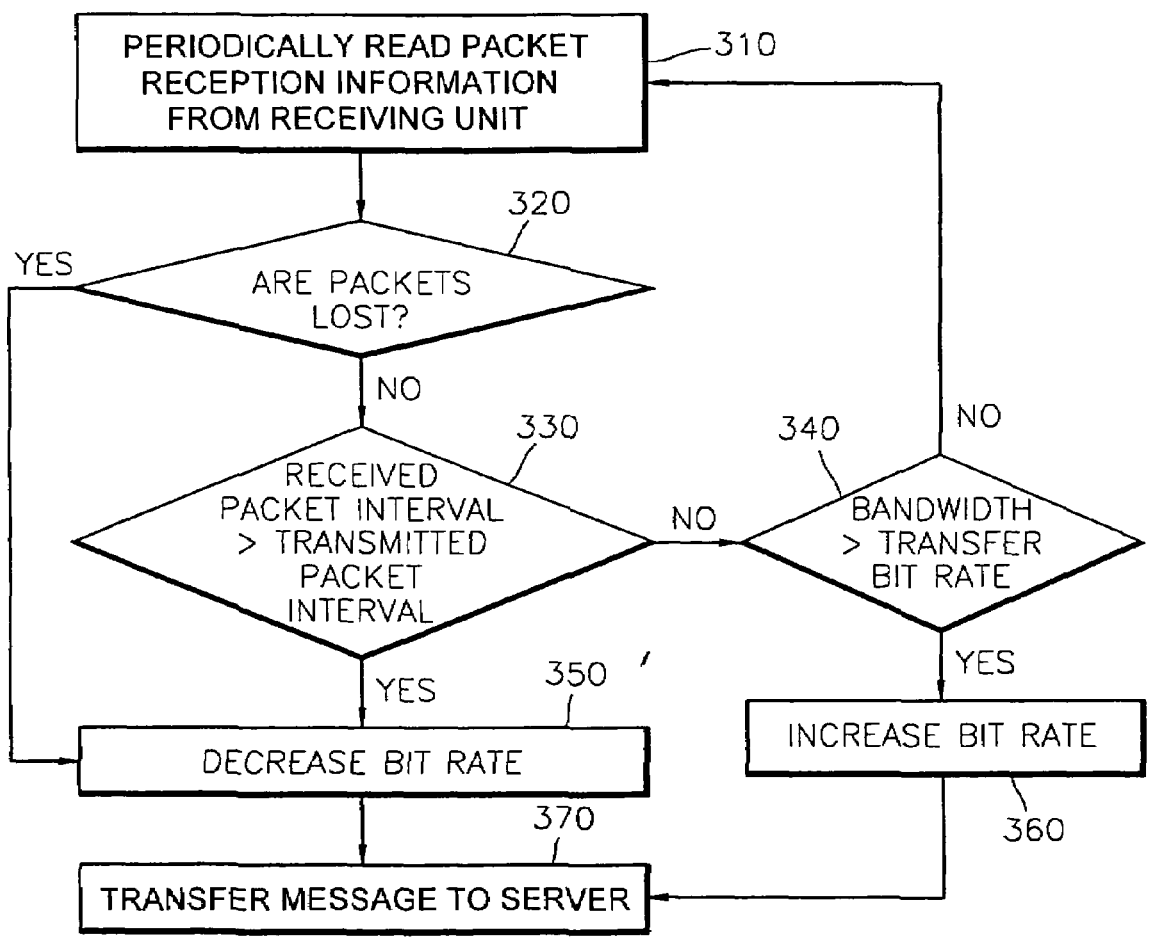
FIG. 2 is a flow chart illustrating the operation of a quality of service (QoS) determining unit of a client according to the embodiment of the present invention.

FIG. 2 is a flow chart illustrating the operation of a quality of service (QoS) determining unit of a client according to an embodiment of the present invention. The operation of the QoS determining unit 230 will be described in detail with reference to FIGS. 1 and 2.

In step 310, the QoS determining unit 230 periodically and consecutively reads the reception information with respect to the packets received from the receiving unit 220.

Here, the reception information includes an inter arrival time (delay) of the received packets, loss of the packets, and the size of the packets.

In step 320, it is determined whether the received packets are lost or not. In case that loss occurs in the received packets in the determination result of step 320, in step 350, the QoS determining unit 230 determines that decreasing the transfer bit rate is required. In step 370, in case that the predetermined control signal BRCS for decreasing the transfer bit rate is output to the QoS determining unit 140 of the server 110, the QoS determining unit 140 decreases the transfer bit rate in response to the control signal BRCS. In this case, if the transfer bit rate is changed, the transmitted packet interval and the size of the packets are changed.

In case that loss does not occur in the received packets in the determination result of step 320, in step 330, the QoS determining unit 230 compares an inter time between two packets that are received by the receiving unit 220 (hereinafter, referred to as a 'received packet interval') with an inter time between two packets that are transmitted by the transmitting unit 160(hereinafter, referred to as a 'transmitted packet interval').

For example, when network congestion or bottleneck on the streaming path 250 occurs, the received packet interval is increased more than the transmitted packet interval. That is, the transfer bit rate and the reception bit rate are varied.

When the received packet interval is larger than the transmitted packet interval in the comparison result of step 330, in step 350, the QoS determining unit 230 decreases the transfer bit rate, and in step 370, the QoS determining unit 230 outputs the predetermined control signal BRCS for decreasing the transfer bit rate to the Qos controlling unit 140.

Thus, the QoS controlling unit 140 decreases the transfer bit rate in response to the control signal BRCS, and thus, the transmitted packet interval is increased.

When the received packet interval is the same as the transmitted packet interval in the determination result of step 330, in step 340, the QoS determining unit 230 compares the bandwidth of the streaming path 250 with the transfer bit rate. If the bandwidth of the streaming path 250 is larger than the transfer bit rate in the determination result of step 340, the QoS determining unit 230 increases the transfer bit rate and outputs the predetermined control signal BRCS for increasing the transfer bit rate to the QoS controlling unit 140.

Thus, the QoS controlling unit 140 increases the transfer bit rate to the bandwidth that is initially measured by the bandwidth-measuring unit 130 in response to the control signal BRCS. In this case, the increased transfer bit rate is preferably smaller than the bandwidth that is initially measured by the bandwidth-measuring unit 130.

If the bandwidth of the streaming path 250 is smaller than the transfer bit rate in the determination result of step 340, in step 360, the QoS determining unit 230 performs the above steps 310 through 370 again.

The QoS determining unit 230 transmits the control signal BRCS to the QoS controlling unit 140 of the server 110 only when the transfer bit rate must be changed, and thus the traffic of the network caused by the control signal BRCS can be minimized so as to control the QoS controlling unit 140.

The real-time multimedia streaming system and method according to the embodiment of the present invention can be employed in various fields where all streaming techniques are used, such as video on demand (VOD), music on demand (MOD), audio on demand (AOD), or Internet phone.

As described above, in the real-time multimedia streaming system and method according to the present invention, the state of the network is sensed, and thus the transfer bit rate can be automatically controlled according to the state of the network.

In addition, even though network congestion occurs during streaming, the state of the network is checked, and loss of packets can be minimized, and thus high quality services become available.

Further, delay of packets and loss of packets, which are caused by network congestion, can be minimized, and thus data can be continuously retrieved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A streaming client, comprising:
   a receiving unit for receiving packetized data at a second bit rate, wherein a streaming server transmits the packetized data through a streaming path at a first bit rate; and
   a determining unit for determining a state of the streaming path by comparing the first bit rate with the second bit rate and outputting a control signal corresponding to the comparison result for changing the first bit rate based on the state of the streaming path to the streaming server.

2. The client of claim 1, wherein the determining unit outputs to the streaming server the control signal for decreasing the first bit rate when loss occurs in the received packetized data, and wherein the determining unit compares the first bit rate with the second bit rate and outputs to the streaming server the control signal corresponding to the comparison result when loss does not occur in the received packetized data.

3. The client of claim 1, wherein the determining unit compares the first bit rate with the second bit rate and outputs to the streaming server the control signal for decreasing the first bit rate when the second bit rate is larger than the first bit rate.

4. The client of claim 1, wherein the determining unit compares a measured bandwidth of the streaming path with the first bit rate when the second bit rate is not larger than the first bit rate, and outputs to the streaming server the control signal for increasing the first bit rate to the bandwidth according to the comparison result.

5. The client of claim 1, wherein if the first bit rate is the same as the second bit rate and if a bandwidth of the streaming path measured before streaming is larger than the first bit rate, the determining unit outputs to the streaming server the control signal for increasing the first bit rate.

6. A streaming server, comprising:
   a bandwidth-measuring unit for measuring a bandwidth of a streaming path;
   a controlling unit for determining a first bit rate in response to the bandwidth measured by the bandwidth-measuring unit during a first stage when streaming begins, and controlling the first bit rate in response to a control signal for changing the first bit rate based on a state of the streaming path determined by a streaming client, wherein the control signal is received from the streaming client during a second stage when streaming is in progress;
   a media-controlling unit for outputting data corresponding to the first bit rate from a scalable encoded bitstream; and a transmitting unit for receiving the outputted data and transmitting paclketized data at the first bit rate.

7. The server of claim 6, wherein the bandwidth measuring unit uses a packet-pair algorithm to measure the bandwidth of the streaming path.

8. A multimedia streaming system, comprising:
a streaming server, comprising:
a bandwidth-measuring unit for measuring a bandwidth of a streaming path;
a controlling unit for determining a first bit rate in response to the bandwidth measured by the bandwidth-measuring unit during a first stage when streaming begins, and controlling the first bit rate in response to a control signal received from a streaming client during a second stage when streaming is in progress;
a media-controlling unit for outputting data corresponding to the first bit rate from a scalable encoded bit-stream;
a transmitting unit for receiving the outputted data and transmitting packetized data at the first bit rate; and a streaming client, comprising:
a receiving unit for receiving the packetized data at a second bit rate, wherein a streaming server transmits the packetized data at the first bit rate; and
a determining unit for determining a state of the streaming path by comparing the first bit rate with the second bit rate and outputting the control signal corresponding to the comparison result for changing the first bit rate based on the state of the streaming path to the streaming server.

9. A method of multimedia streaming for a streaming client, comprising:
(a) receiving packetized data at a second bit rate, wherein a streaming server transmits the packetized data through a streaming path at a first bit rate;
(b) determining a state of the streaming path by comparing the first bit rate with the second bit rate; and
(c) outputting a control signal corresponding to the comparison result for changing the first bit rate based on the state of the streaming path to the streaming server.

10. The method of claim 9, wherein steps (b) and (c) comprise:
outputting the control signal to control the first bit rate or a first packet interval when it is determined that packets are lost on the streaming path, and comparing the first packet interval with a second packet interval and outputting the control signal to control the first bit rate or the first packet interval according to the comparison result when it is determined that packets are not lost on the streaming path.

11. The method of claim 9, wherein step (a) includes determining the second bit rate or a second packet interval according to congestion on the streaming path, bottleneck on the streaming path or a number of users connected to the streaming path.

12. The method of claim 9, wherein step (c) further comprises:
(c1) outputting the control signal to the streaming server to decrease the first bit rate when a second packet interval is larger than a first packet interval, and to increase the first bit rate to a bandwidth of the streaming path when the second packet interval is the same as the first packet interval and the bandwidth of the streaming path measured before streaming is larger than the first bit rate; and
(c2) performing step (a) if the second packet interval is the same as the first packet interval and the bandwidth of the streaming path is smaller than the first bit rate.

13. A method of multimedia streaming for a streaming server, the method comprising:
(a) measuring a bandwidth of a streaming path;
(b) determining a first bit rate in response to the bandwidth measured during a first stage when streaming begins, and controlling the first bit rate in response to a control signal for changing the first bit rate based on a state of the streaming path determined by a streaming client, wherein the control signal is received from the streaming client during a second stage when streaming is in progress;
(c) outputting data corresponding to the first bit rate from a scalable encoded bit stream; and
(d) receiving the outputted data and transmitting packetized data at the first bit rate.

14. The method of claim 13, wherein step (b) further comprises:
(b1) packetizing bit stream data at the first bit rate according to the bandwidth of the streaming path measured at step (a) when streaming begins, and controlling the packets at a first packet interval; and
(b2) packetizing bit stream data at the first bit rate controlled in response to the control signal received from the streaming client when streaming is in progress, and controlling the packets at the first packet interval.

15. A method of multimedia streaming, comprising:
(a) measuring a bandwidth of a streaming path;
(b) determining a first bit rate in response to the bandwidth measured during a first stage when streaming begins, and controlling the first bit rate in response to a control signal received from a streaming client during a second stage when streaming is in progress;
(c) outputting data corresponding to the first bit rate from a scalable encoded bit stream;
(d) receiving the outputted data and transmitting packetized data at the first bit rate;
(e) receiving the packetized data at a second bit rate, wherein a streaming server transmits the packetized data at the first bit rate; and
(f) determining a state of the streaming path by comparing the first bit rate with the second bit rate and outputting the control signal corresponding to the comparison result for changing the first bit rate based on the state of the streaming path to the streaming server.

* * * * *